Dec. 3, 1935.                J. GAREY                2,022,804
                      DEVICE FOR APPLYING TIRE CHAINS
                           Filed Feb. 2, 1934
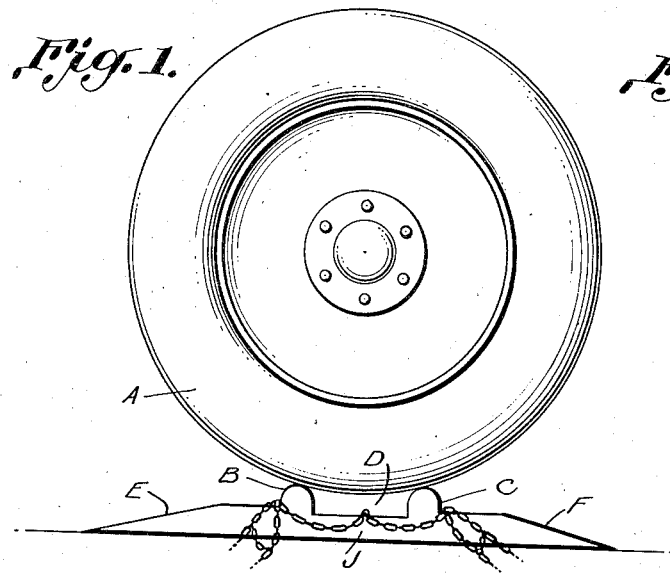
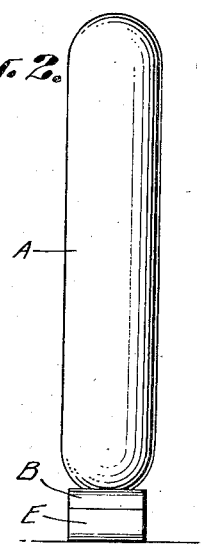
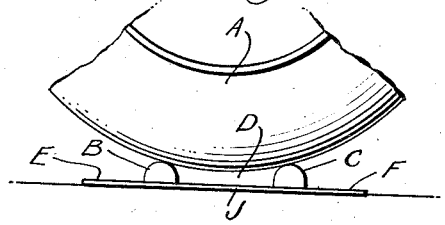
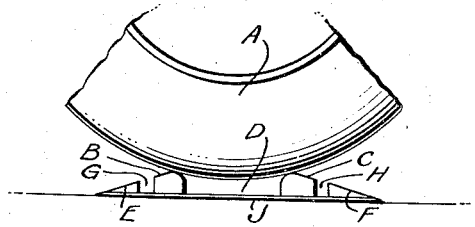
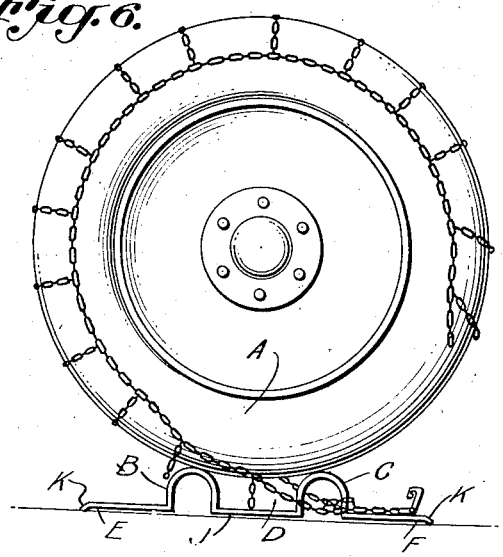
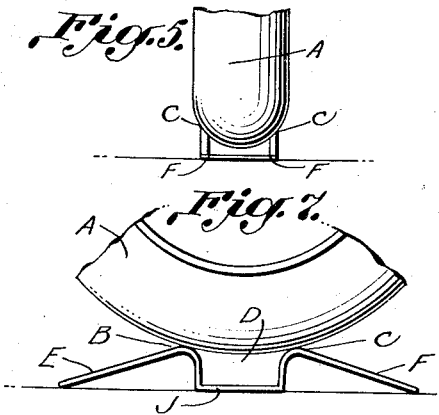
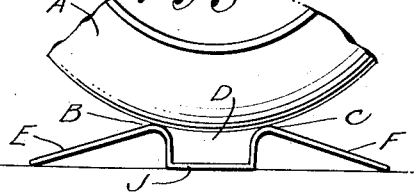
Inventor:
John Garey
By Maxwell Barnes
    Attorney Patented Dec. 3, 1935

2,022,804

UNITED STATES PATENT OFFICE 2,022,804

DEVICE FOR APPLYING TIRE CHAINS

John Garey, Montclair, N. J.

Application February 2, 1934, Serial No. 709,426

6 Claims. (Cl. 152—14)

This invention relates to a device for use in applying tire chains to automobile wheels. The device is also useful for removing tire chains.

Referring to the drawing, Fig. 1 illustrates diagrammatically a side view and Fig. 2, an end view, of one form of the device with an automobile wheel mounted thereon. Figs. 3, 4 and 7 illustrate side views of modified forms of the device. Fig. 6 illustrates another modified form of the device and also shows how it is used in applying a chain. Fig. 5 is an end view illustrating how parallel rails may be used in lieu of a single wide member to form the stilts and approaches.

The device comprises approaches E, F, and stilts B, C, provided with a connecting member J.

It may be made of wood, metal or other suitable material. A very satisfactory device of the form illustrated in Fig. 6 or 7 may be made by simply bending a stiff sheet of steel or other suitable metal to the shape illustrated.

Only one approach E is necessary but two approach portions E, F, are advantageous, so that, if, in using the device, an automobile wheel is inadvertently driven forward or backward over both the stilts B and C, instead of coming to rest thereon, the wheel may be made to mount the device from the other end without readjusting the device, merely by driving the automobile in the opposite direction.

The approaches E and F should be long enough so that an automobile wheel, in approaching the device, will rest firmly thereon before touching the nearest stilt. The weight of the automobile thus clamps the device in position against the ground and aids the wheel in mounting the stilt. While the approach may be obviously made longer or shorter for use with particular types of wheels, I have found that about five to seven inches is a very satisfactory length for the approach for use with most wheels.

The ends of the approaches may be advantageously bent slightly downward as indicated at K, K, in Fig. 6, to assist in gripping, although I have found that this is not necessary.

The width of the device should be such as not to put any severe strain on the tires, and may, of course, be varied considerably. I have found about three and a half inches a very satisfactory width.

Each stilt, B, C, is advantageously rounded to facilitate mounting with a minimum of strain on the tires.

The height of the stilts B and C above the connection member J should be great enough so that the cross link of a tire chain may be moved freely about in the space D enclosed by the connecting member J, the stilts B, C, and an automobile wheel mounted thereon. Free play for the cross link or cross links passing beneath the tire greatly facilitates adjusting the chain about the tire and fastening or unfastening the catches of the chain.

While it is advantageous that the length of the member J be great enough to permit some motion of the cross link or links passing beneath the wheel around the circumference of the wheel, I have found that free play for such cross link or links in the direction parallel to the axle of the wheel is of greater importance in facilitating the adjustment and fastening or unfastening of the chain.

It is also advantageous to have the stilts B, C, of sufficient height above the approaches E, F, to permit the tire chain to be drawn over the approaches E, F, near the base of the stilts B, C, as illustrated in Fig. 1, without interference from the tire when the wheel is mounted on the stilts. On the other hand, the stilts B, C, should not rise so high above their approaches as to interfere with the easy mounting of the wheel when it is driven onto the device. I have found about two and a half inches above the approaches E, F, and the connecting member J, a convenient height for the stilts B, C, for most purposes. It can obviously be varied considerably if desired.

The approaches E, F, may be sloped toward the stilts to facilitate mounting, as illustrated in Figs. 1, 4, or 7, in which case it is advantageous to level off the slope as illustrated in Fig. 1, or provide a groove G as illustrated in Fig. 4, or make the slope sufficiently abrupt as illustrated in Fig. 7, to permit the chain to be drawn freely beneath the wheel outside the stilts as illustrated in Fig. 1.

The distance between the tops of the stilts B, C, is also a matter of importance. It should bear such relation to the diameter of the wheel and the height of the stilts B, C, as not to interfere with free play for the cross links in the space D, as heretofore mentioned. This distance must also be great enough to provide a firm support for the wheel on either side, so as to prevent any tendency for the wheel to rotate when mounted thereon.

Furthermore, it is advantageous to have this distance great enough so that a wheel after being driven over the stilt B or C will strike the other stilt with an easily perceptible bump. Such bump serves as a signal to the driver that the wheel is in mounted position, and aids him in stopping the car at the appropriate moment.

The device is used as follows:

The device is placed lengthwise on the road or floor in back of a wheel of an automobile and in line with the wheel either in front of or behind it, so that, if the automobile is backed or driven straight, the wheel will mount the device.

The tire chain is now laid over the device as illustrated in Fig. 1, so that one of the cross links comes in the space D, between the stilts B and C. The next cross link toward the front and also advantageously the inner side of the front end of the chain are now brought around in front of stilt B and close to it so that they do not obstruct the course of the wheel in mounting. In a like manner the next cross link to the rear from the one in space D and, also, advantageously the inner side of the rear end of the tire chain are brought around in back of stilt C.

The automobile is backed until the wheel has mounted over stilt B and rests on both stilts B and C as shown in Fig. 1. The reaching of this position will be indicated to the driver by a slight bump when the tire comes down on stilt C. Should the wheel be backed too far, it merely mounts over stilt C and the car can be driven forward until the top position is reached, as indicated by a corresponding bump as the wheel comes down on the stilt B.

The front ends of the tire chain are now drawn over the top of the tire, as illustrated in Fig. 6, and clamped to the rear ends in the usual way. The fact that the tire does not rest on the tire chain in any way allows play for lateral adjustment of the chain and also for some motion in either direction around the circumference of the tire within the limits permitted by the space D. This greatly facilitates the bringing of chain ends together for clamping.

To take off the tire chains the wheel is driven up onto the device again and the chain ends unclamped. The play allowed for the chain beneath the wheel by the function of my device assists in removal of the chains also.

It will be obvious from the foregoing that various modifications may be made without departing from the spirit and scope of my invention.

What I claim is:

1. In a device for applying tire chains, comprising an approach and two stilts spaced apart, the height of said stilts being such that a tire chain cross link may be moved freely for both lateral and longitudinal adjustment in the space between said base and an automobile wheel resting on said stilts.

2. A device in accordance with claim 1, having an abruptly rising stilt with a substantially horizontal approach of such length that an automobile wheel in mounting thereon rests on said base before contacting with a stilt.

3. A device in accordance with claim 1, in which said stilts rise abruptly from the base sufficiently to permit the ends of a tire chain to be drawn freely around the outside of and close to the stilts when an automobile wheel is mounted on the stilts.

4. A device in accordance with claim 1, in which said stilts are spaced apart to cause a slight but noticeable bump when an automobile wheel passing over the one contacts with the other, having an abruptly rising stilt with a substantially horizontal approach of such length that an automobile wheel in mounting thereon rests on said base before contacting with a stilt, and in which said stilts rise abruptly from the base sufficiently to permit the ends of a tire chain to be drawn freely around the outside of and close to the stilts when an automobile wheel is mounted on the stilts.

5. A device in accordance with claim 1, in which said stilts are spaced apart to cause a slight but noticeable bump when an automobile wheel passing over the one contacts with the other, said approach being inclined and having a groove therein through which the end of said tire chain may be passed.

6. A device in accordance with claim 1, in which said stilts are spaced apart to cause a slight but noticeable bump when an automobile wheel passing over the one contacts with the other, having an abruptly rising stilt with a substantially horizontal approach of such length that an automobile wheel in mounting thereon rests on said base before contacting with a stilt, in which said stilts rise abruptly from the base sufficiently to permit the ends of a tire chain to be drawn freely around the outside of and close to the stilts when an automobile wheel is mounted on the stilts, and formed of stiff bent sheet metal.

JOHN GAREY.